United States Patent [19]
Ogasawara

[11] Patent Number: 5,243,267
[45] Date of Patent: Sep. 7, 1993

[54] METHOD FOR CONTROLLING A LUMBAR SUPPORT DEVICE IN A POWERED SEAT AND MOTOR CONTROL DEVICE PROVIDED THEREIN IN ASSOCIATION THEREWITH

[75] Inventor: Hiromitsu Ogasawara, Akishima, Japan

[73] Assignee: Tachi-S Co., Ltd., Akishima, Japan

[21] Appl. No.: 957,234

[22] Filed: Oct. 6, 1992

[51] Int. Cl.$^5$ .................... B60N 2/22; G05B 11/00
[52] U.S. Cl. .................... 318/590; 318/567; 297/284.4
[58] Field of Search .................... 318/560, 567, 590; 297/284 A, 284 B, 284 C, 284 R, 284.4; 364/424.05

[56] References Cited

U.S. PATENT DOCUMENTS

| | | | |
|---|---|---|---|
| 4,966,410 | 10/1990 | Bishai | 297/284 |
| 4,981,131 | 1/1991 | Hazard | 128/38 |
| 5,005,904 | 4/1991 | Clemens et al. | 297/284 |
| 5,065,079 | 11/1991 | Ogasawara | 318/281 |
| 5,127,708 | 7/1992 | Kishi et al. | 297/284 R |
| 5,129,704 | 7/1992 | Kishi et al. | 297/284 R |
| 5,155,685 | 10/1992 | Kishi et al. | 364/424.05 |
| 5,171,209 | 12/1992 | Gamba | 602/13 |

*Primary Examiner*—Bentsu Ro
*Attorney, Agent, or Firm*—Oldham, Oldham, & Wilson Co.

[57] ABSTRACT

A method for controlling a lumbar support device and a motor control device provided, which are applied to a powered seat. The motor for causing fore-and-aft movement of a lumbar plate is controlled under a selected one of burst and fluctuation control modes. In the burst control mode, the lumbar plate is moved periodically in the fore-and-aft direction, whereas in the fluctuation control mode, the lumbar plate is moved in a aperiodic and weavering way in that direction, for example, on the basis of 1/f fluctuation waveform, to thereby alleviate a fatigue of lumbar part of a passenger sitting on the seat.

8 Claims, 10 Drawing Sheets

METHOD FOR CONTROLLING A LUMBAR SUPPORT DEVICE IN A POWERED SEAT AND MOTOR CONTROL DEVICE PROVIDED THEREIN IN ASSOCIATION THEREWITH

BACKGROUND OF INVENTION

1. Field of the Invention

The present invention relates to a lumbar support device provided in a powered seat of an automobile, and is particularly directed to a method for controlling the lumbar support device under a motor control so as to adjust the fore-and-aft position of the same for a proper support of the lumbar portion of an occupant on the seat and a motor control device provided in the seat in association with such method.

2. Description of Prior Art

In automotive seats, it is well known that a lumbar support device is provided in some of them as a means for giving a proper support to a lumbar part of an occupant sitting on the seat, with a view to making stable his or her seating posture and protecting him or her against a fatigue developed from a long period of seating in the seat. The lumbar support device is designed to cause movement of a lumbar support plate which gives a pressure support to the occupant's lumbar part. The control of such lumbar support plate (for the for-and-aft movement of the same) is typically made through control of associated motor by manual switch operations.

In connection with the lumbar support, it has been found from the recent experiments and resarches that the spine or vertebra of a person who sits on a seat with the smallest fatigue represents an inverted "S" shape, which has led us to presume that a deformation of such inverted-S-shaped vertebra appears to create a fatigue or a tired feeling in the person on the seat. It is therefore thought that the fatique or tired sense originates from a muscular fatigue which arises from an uneven force distribution of the person's muscle due to the foregoing deformation of inverted "S" shape of vertebra.

With this diagnostic aspect in view, most of known lumbar support devices are so designed that its lumbar support plate may be adjusted in support force against the person's lumbar part such as to keep his or her vertebra in that ideal inverted "S" shape in order to eliminate the fatigue.

However, the hitherto lumbar support plate does not take into account the fact that a long period of sitting on a seat leads soon to the muscular fatigue of passenger thereon and consequently the passenger changes his or her seating posture, encountering again the deformation of vertebra from the inverted "S" shape and thus suffering from the foregoing fatigue problem. The reason is that, according to this known device, the lumbar support plate, which contacts the back of passenger, is normally kept stationary and applies a predetermined support force, constantaly, to that back portion or lumbar part of passenger at a given pressure amount for attaining the ideal inverted "S" shape of vertebra. In other words, the device merely gives such support force to the passenger's back, and the passenger is forced to be restrained under such fixed conditions, which results in causing easy creation of the muscular fatigue on the contrary and does not attain the vertebra's inverted "S" shape properly depending upon the seating state of the passenger on the seat.

SUMMARY OF THE INVENTION

In view of the above-stated drawbacks, it is a purpose of the present invention to provide a method and motor control device for controlling a lumbar support device in a powered seat, which is improved in alleviating a fatigue of a lumbar part of an occupant on the seat.

To achieve such purpose, according to the present invention, there is basically provided a method which comprises the steps:

providing, as one of a motor drive control mode, a manual control mode for allowing the occupant to manually control a drive of the motor to apply a predetermined lumbar support force to the lumbar part of the occupant;

providing, as one of a motor drive control mode, a burst control mode for controlling the drive of the motor so as to effect the fore-and-aft movement of lumbar plate in a periodic way;

providing, as one of a motor drive control mode, a fluctuation control mode for controlling the drive of motor so as to effect the fore-and-aft movement of lumbar plate in an aperiodic way;

wherein those burst and fluctuation control modes are effected in an automatic control mode;

permitting a selection to be done for one of the burst and fluctuation control modes;

causing the motor, if the burst control mode is selected, to be driven by operation of a busrt switch means in a generally periodic way, with a pause time given per period, so as to repeat the fore-and-aft movement of lumbar plate in such generally periodic way for a predetermined time, such that the lumbar plate is kept still per such pause time within the predetermined time; and causing the motor, if the fluctuation control mode is selected, to be driven by operation of a fluctuation switch means in such aperiodic way for a predetermined time so as to repeat the fore-and-aft movement of the lumbar plate in conformity with the aperiodic way, within a predetermined fore-and-aft movement range;

wherein, is the fluctuation control mode, the aperiodic drive of said motor is effected according to a predetermined number of drive times and a predetermined number of drive amount, both of which are set on a basis of a predetermined number of frequency portions and a predetermined number of period portions which are both obtained from a 1/f fluctuation waveform synthesized under a predetermined Fourier series.

Preferably, such pause time for keeping still the lumbar plate under the burst control mode may be set selectively at one of preset plural sorts of times by a selection switch means.

The method may include the steps of: detecting a position of said lumbar plate within said fore-and-aft movement range, prior to said motor control modes being executed storing in memory said position as an initial position, then executing the motor control modes, making a comparison between a present position of the lumbar plate and the stored initial position of the same, and causing the motor to be automatically returned to a position corresponding to the initial position.

In one aspect of the invention, the method includes the steps of: preparing a quasi fluctuation waveform which outlines the 1/f fluctuation waveform in such a manner as to exclude most of minute irregular frequency and period portions therefrom, then computing out, on the basis of such quasi fluctuation waveform, the foregoing predetermined number of drive times and drive amounts, listing numerically those drive times and drive amounts and itemizing them per step in a time table, and using that time table to effect one cycle of the fluctuation control mode.

According to the present invention, there is also a motor control device for effecting the above-described methods. It includes a motor for causing the fore-and-aft movement of the lumbar plate, a manual switch means operable to manually control the motor, a burst control control switch means operable to control the motor in a periodic way, a fluctuation control switch means operable to control the motor in an aperiodic way, wherein both burst and fluctuation control modes are effected as an automatic control mode, a drive circuit including a switching element for driving or stopping the motor, a detection means for detecting a position of the lumbar plate, a central processing unit, and a means for permitting a selection to be done for one of those manual and automatic control modes.

Accordingly, the repetition of such fore-and-aft of lumbar plate presented by the above two burst and fluctuation controls provides a massage effect to the lumbar part of an occupant on the seat, thereby helping the occupant to maintain such ideal reverse "S" shape of vertebra, with a comfortable seating posture and alleviating his or her fatigue during a long period of seating in the seat.

DETAILED DESCRIPTION OF PREFERRED EMBODIMENT OF THE INVENTION

Figure 1:
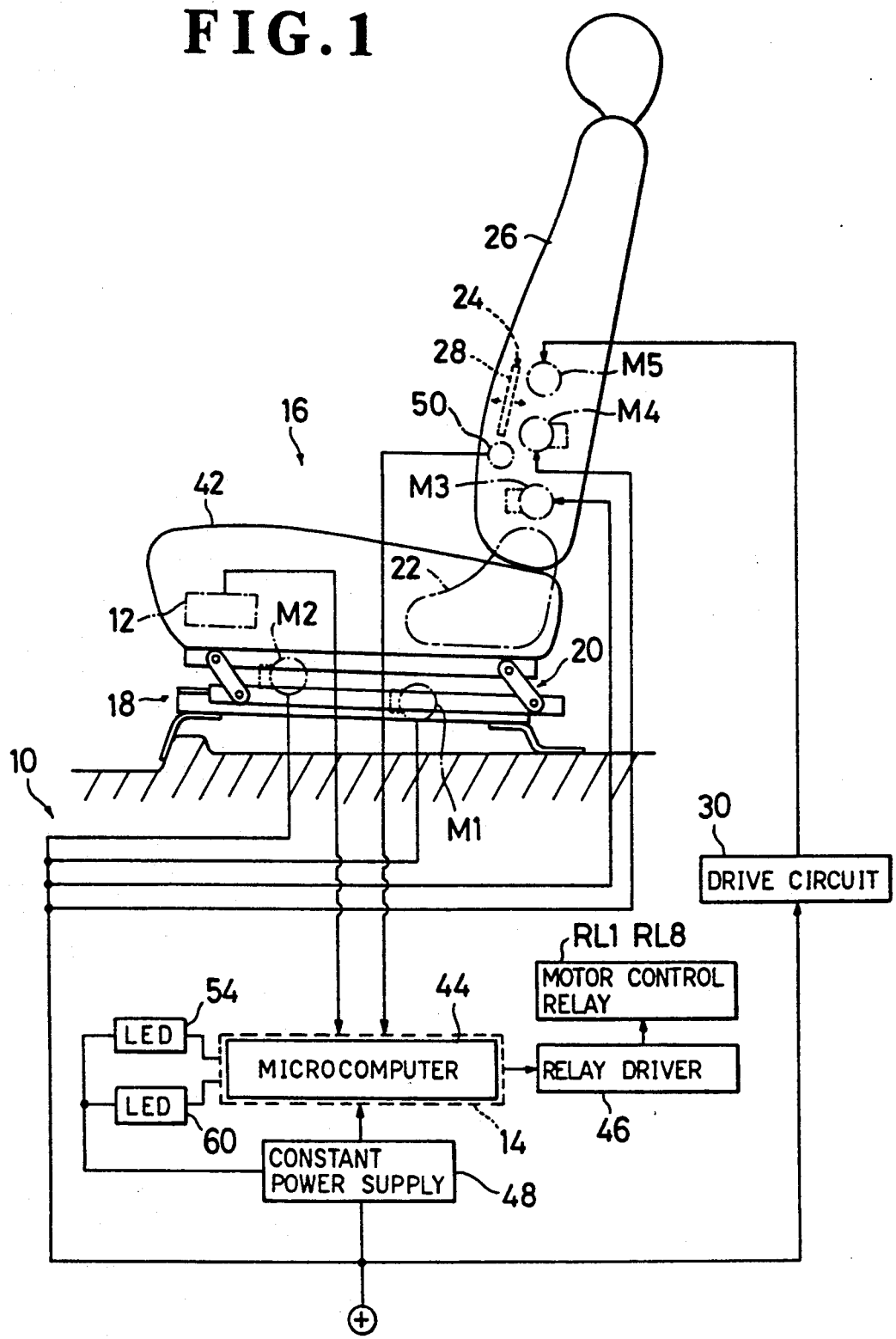
FIG. 1 is a schematic diagram of a motor control device in a powered seat in accordance with the present invention.
Figure 2:
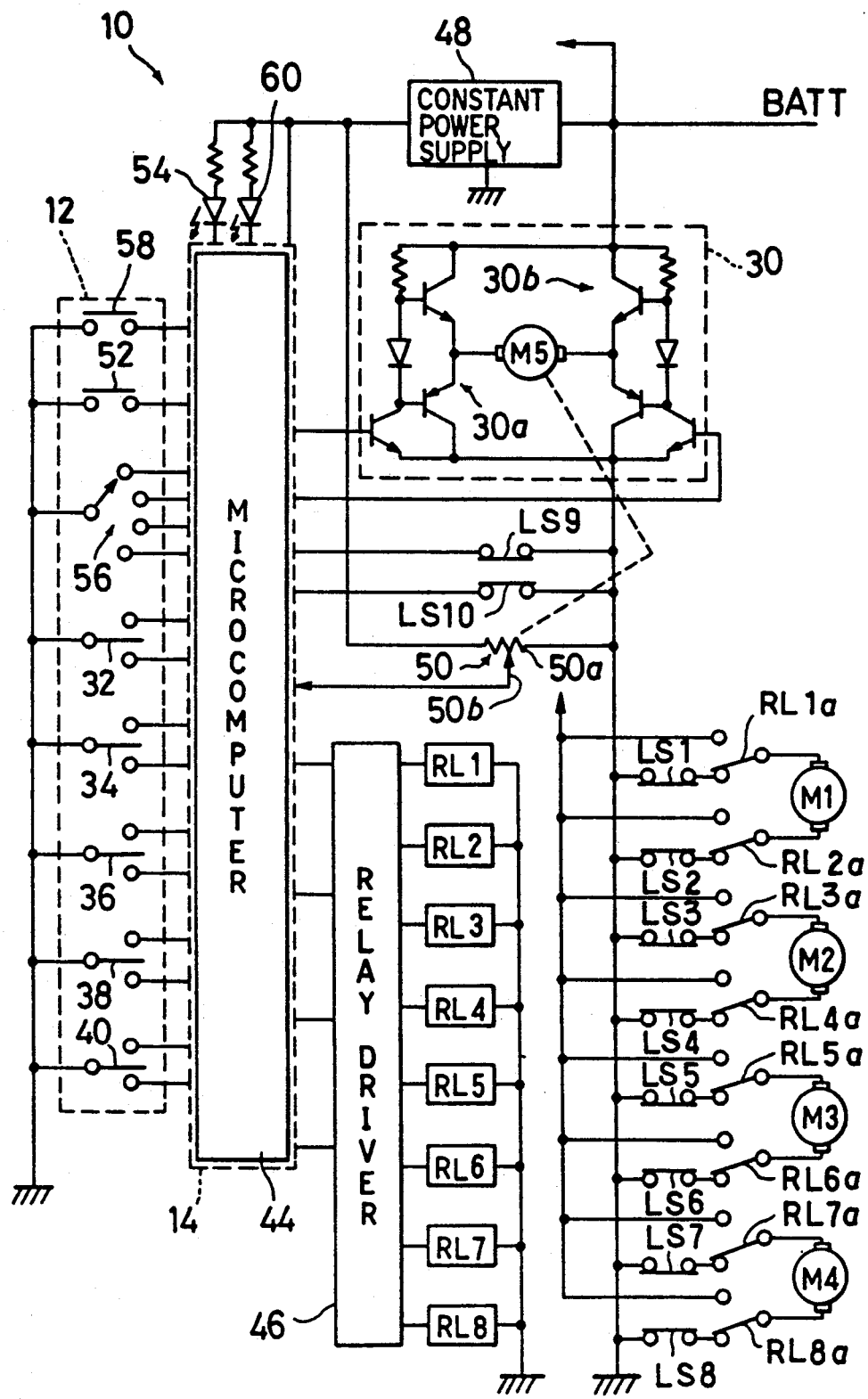
FIG. 2 is a schematic block diagram showing a circuitry of the motor control device.

Referring to FIGS. 1 and 2, there is shown a motor control device (10) in accordance with the present invention, which basically comprises a control switch unit (12), a central processing unit (14), motors (M1 to M5), relays (RL1 to RL8), and a drive circuit (30) for motor (M5).

The motors (M1 to M5) may be of a DC geared type, wherein the first one (M1) is adpated to drive a seat slide device, the second one (M2) is to drive a seat lifter (20), the third one (M3) is to drive a reclining device (22), and the fourth and fifth ones (M4)(M5) are to drive a lumbar support device (24).

Those seating posture adjustment devices are operated to move the seat (16) forwardly and backwardly, tilt the seat back (26) in the same directions and raise or lower the seat (16) for proper seating posture that an occupant can attain on the seat (16). The seat slide device (18), seat lifter (20) and reclining device (22) are all conventional devices and not the subject matter of the present invention, but what will be described herein is mainly directed to the lumbar support device (24).

As can be seen from FIGS. 1 and 2, the first to third motors (M1 to M3) are respectively connected with the motor control relays (RL1 to RL6) which have their respective relay contacts (RL1a to RL6a), while being connected with a battery (BATT). As in FIG. 2, the terminals of those motors (M1 to M3) are also connected with the limit switches (LS1 to LS6) of self-return, push-off type, respectively.

The three motors (M1 to M3) are connected, via the central processing unit (14) (to be referred to as "CPU"), with the control switch unit (12). Namely, the motors (M1 to M3) are respectively connected with a seat slide switch (32), a seat lifter switch (34), and a reclining switch (36).

With the above arrangement, operating those switches (32)(34)(36) will permit adjustment of fore-and-aft position of the seat (16), height of the same, and reclining angle of seat back (26) in a manual switching manner, within their respective movement range set by the limit switches (LS1 to LS6). This is however not the subject matter of the present invention either, and any specific description thereon is omitted.

The CPU (14) includes a microcomputer (44) which processes input data according to a program stored therein, and outputs a proper control signal. The control signal will be transmitted into the relay driver (46), or the drive circuit (30) associated with the lumbar support device (24).

Designation (48) denotes a constant power supply which is connected with both CPU (14) and battery (BATT) so that the CPU (14) works stably under a constant current being flowed thereinto from the power supply.

The fourth and fifth motors (M4)(M5) are adapated to effect an adjustment in fore-and-aft and vertical positions of a lumbar support plate (28) provided in the lumbar support device (24).

The fourth motor (M4) is connected with the CPU (14) via the associated relays (RL7, RL8) and further connected with a vertical adjustment switch (38). Hence, the vertical adjustment switch (38) is operable to adjust the vertical position of the lumbar support plate (28) within upper and lower movement ranges set by two associated limit switches (LS7)(LS8). Stated in detail, operating the switch (38) causes the CPU (14) to output a proper control signal into the relay driver (46) which in turn emits a signal so as to energize either of the relays (RL7)(RL8) to turn on the corresponding either of relay contacts (RL7a)(RL8a). Then, the motor (M4) is driven in a normal or reverse direction, to thereby cause vertical movement of the lumbar plate (28) and permit a desired vertical position of the lumbar plate (28).

The fifth motor (M5) is connected with the drive circuit (30). The drive circuit (30) comprises a pair of first and second switching elements (30a)(30b). Both armature terminals of the motor (M5) are connected with those two switching elements (30a)(30b), respectively. Such drive circuit (30) is connected via the CPU (14) with a fore-and-aft adjustment switch (40). Hence, turning this switch (40) on to "forward" switch position emits a corresponding signal to the CPU (14), which in turn outputs a proper control signal into one of the two switching elements (30a)(30b) for causing normal or reverse drive of the motor (M5), whereupon the lumbar plate (28) is caused to be moved in the forward direction; i.e. forwardly of the seat back (26). Reversely, turning the siwtch (40) on to "reverse" switch position emits a corresponding signal to the CPU (14) and then another of the switching elements (30a)(30b) is turned on for driving the motor (M5) to cause backward movement of the lumbar plate (28); i.e., the lumbar plate is moved backwardly of the seat back (26). The two switching elements (30a) (30b) are formed by a conventional transistor circuit, as shown, and a specific expalation thereon is omitted.

It is noted that the fore-and-aft movement range of lumbar plate (28) is limited by a first limit switch (LS9) and a second limit switch (LS10) which are each of a self-return, push-off type and connected with the CPU(14). Although not shown, those limit switches (LS9)(LS10) are disposed at a suitable part in the seat back (26) in the proximity of the lumbar plate (28). An "off" signal emitted from one of the limit switches will cause the CPU (14) to recognize that the lumbar plate (28) has reached either of the forward and backward limits, and immediately instruct the motor (M) to cease its drive.

The motor control device (10) further includes a lumbar plate position detector (50). In the shown embodiment, the detector (50) comprises a variable resistor which forms a potentiometer. As shown in FIG. 2, the potentiometer (50) has a fixed terminal (50a) and a movable terminal (50b). To move the movable terminal (50b) will vary a resistance value in the potentiometer (50). That movable terminal (50b) is so constructed as to be movable together with the fore-and-aft displacement of the lumbar plate (28) along the fixed terminal (50a), which means that the movable terminal (50b) is to be moved according to the normal or reverse drive of the motor (M5), varrying the resistance value of the potentiometer (50) so as to indicate a degree of fore-and-aft movement of the lumbar plate (28). Thus, the CPU (14) detects a moved position of lumbar plate (28) by computing and converting a transmitted resistance value of the potentiometer (50) into a value indicative of a distance at which the the lumbar plate (28) is moved, and then comparing the obtained value with a predetermined reference value set in the CPU (14). The latter "reference value" may be set by a value at the forward limit point of the lumbar plate (28) and further by a value at the backward limit point of the same (28).

According to the present invention, the motor control device (10) is not only capable of a so-called "static support" manual control in the hitherto manner, but also capable of effecting one of the following two automatic controls, selectively, with regard to the fore-and-aft movement of lumbar plate (28): A burst control for causing the fore-and-aft movement of lumbar plate (28) in a substantially periodic way, and a fluctuation control for causing such lumbar plate fore-and-aft movement in an aperiodic way.

Figure 3:
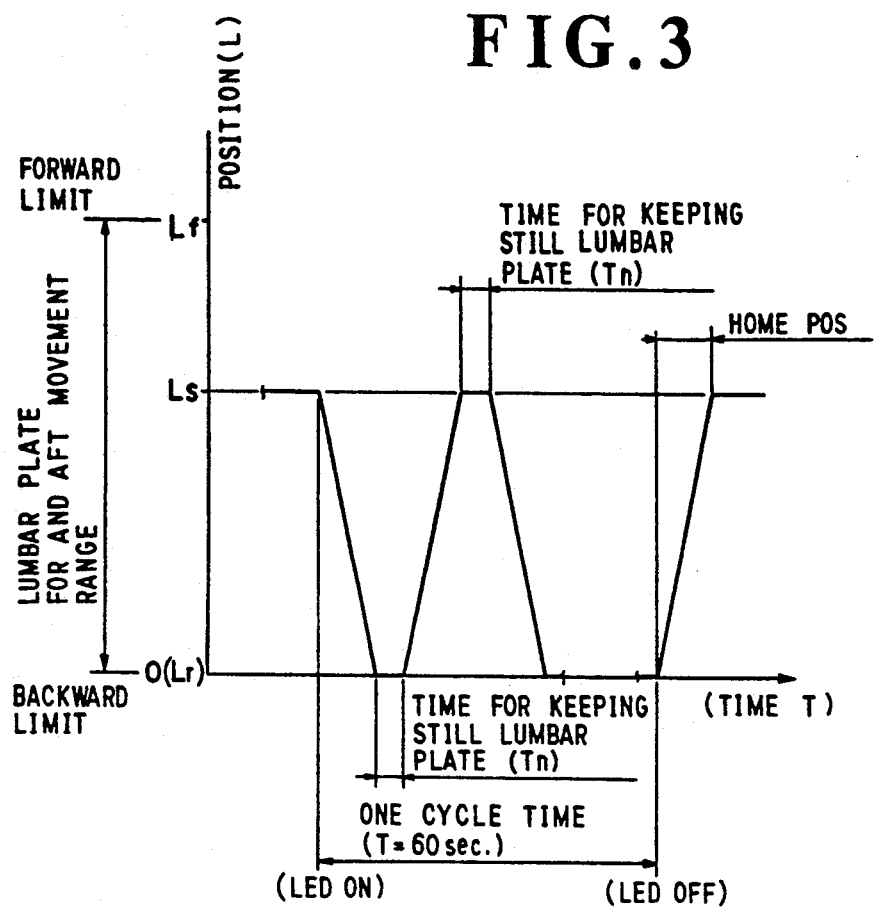
FIG. 3 is a schematic graph showing a motion of a lumbar plate under a burst control mode.

As shown in FIG. 3, in the burst control, a home or initial position (Ls) is preset by a manual control of the motor (M5) in advance of effecting the burst control, and stored in memory within the CPU (14) as a forward limit position of the lumbar plate (28). An on-off control of the motor (M5) by the drive circuit (30) leads to a repeated fore-and-aft movements of the lumbar plate (28) between the initial position (Ls) and backward limit position (Lr), thereby executing the burst control only for a given time.

With this arrangement, the initial position (Ls) of lumbar plate (28) is a pressing position of same for pressing against the lumbar port of an occupant on the seat. Namely, according to this nature of burst control, the lumbar plate (28) is periodically returned to the initial position (a pressing position), which brings about several repeated strokes of pressing actions against the occupant's lumbar part. A burst switch (52) is operable to carry out the burst control. The burst switch (52) is of a self-return, push-type, switch, forming one of the switch unit (12), and connected with the CPU (14).

Designation (54) denotes a burst indication element (54) for indicating the execution of the burst control, notifying to the occupant that the burst control is now in operation. The element (54) shown comprises a light emitting diode (LED) which is connected with the CPU (14) as in FIGS. 1 and 2. The LED is so arranged as to be "on" or "blinked on and off" during the period between the turn-on of burst switch (52) and the termination of one cycle of burst control of the lumbar plate (28). This is advantageous in that the on-going operation of lumbar plate burst control is clearly seen and further one cycle of burst control can readily be noticed, serving to prevent a wrong operation of the burst control.

It is noted from FIG. 3 that the operation period of burst control, i.e., the time for completing one cycle of the burst control, is set to be 60 sec.

After completion of the one cycle of burst control, the lumbar plate (28) is automatically returned to a position corresponding to the initial position (Ls). As shown in FIG. 3, if one cycle of burst control is completed, with the lumbar plate (28) being located at the backward limit position, the lumbar plate (28) will be moved forwardly and returned to a position corresponding to the initial position (Ls) under the control of motor (M5). This insures to keep the occupant sitting on the seat with a good seating posture, even after the burst control has been carried out, and in addition, there is no need to take a trouble to ascertain the position and setting of the lumbar plate (28).

A selection switch (56) is adapted to selectively set a time (Tn) for keeping still the lumbar plate (28) under the burst control mode. As shown in FIG. 2, the switch (56) is a rotary switch having a rotatable contact and plural fixed contact points. In the present embodiment as shown in Table 1 below, the rotary switch (56) has ten (10) fixed contact points which are indicative of 10 selectable switch positions for outputting their respective associated code signals according to ten different sorts of time for keeping still the lumbar plate (28).

TABLE 1

| Switch Positions | Code Signal | | | | Time (Tn) for keeping still lumbar plate (sec.) |
|---|---|---|---|---|---|
| | 1 | 2 | 4 | 8 | |
| 0 | | | | | 0.3 sec. |
| 1 | ● | | | | 0.6 sec. |
| 2 | | ● | | | 0.9 sec. |
| 3 | ● | ● | | | 1.2 sec. |
| 4 | | | ● | | 1.5 sec. |
| 5 | ● | | ● | | 1.8 sec. |
| 6 | | ● | ● | | 2.1 sec. |
| 7 | ● | ● | ● | | 2.4 sec. |
| 8 | | | | ● | 2.7 sec. |
| 9 | ● | | | ● | 3.0 sec. |

The fluctuation control for the fore-and-aft movements of lumbar plate (28) is effected by controlling the drive of motor (M5) in conformity with a specially created aperiodic waveform with a 1/f fluctuation or wavering characteristics (the "f" is a frequency)(i.e. so-called 1/f fluctuation waveform, which is generally thought to provide a most comfortable wavering touch to a human body). Such 1/f fluctuation waveform is obtainable by a waveform synthesizer on the basis of a predetermined Fourier series. With regard to the Fourier series, we formulate it as follows in order to attain a particular 1/ fluctuation weveform.

$$Xi = \sum_{j=1}^{40} Aij \sin(2\pi fij + \theta j)$$

∴ i=1 to n, j=1 to 40, n=1026 wherein, $Aij = 10 \, fij^{-1/10}$ $fij = 0.5 \, 19 \, 10^{j/20}(1+f0\cdot 1/n)$ $f0 = 10^{1/20} - 1$ (minimum frequency)

$\theta j$ is random within $0 \leq \theta j \leq 2\pi$

Figure 4:
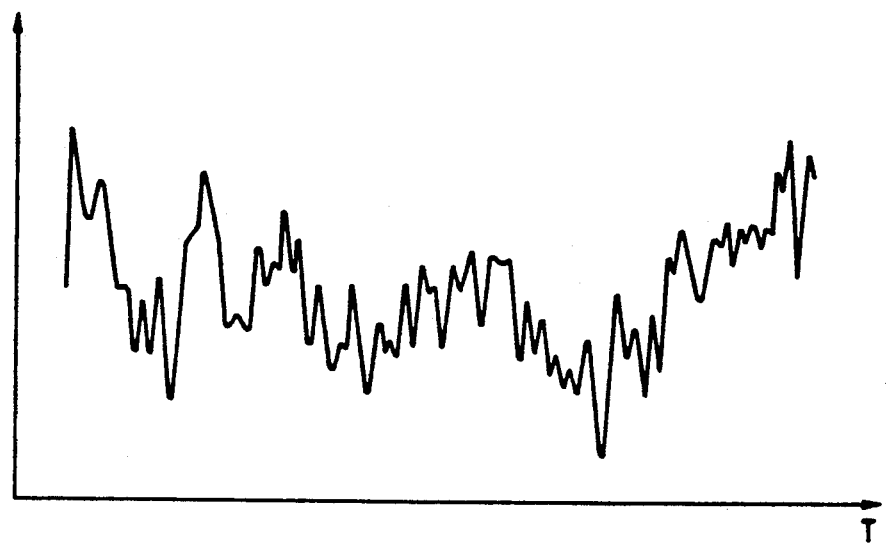
FIG. 4 is a schematic graph showing an example of fluctuation waveform.

Using the above-defined Fourier series, we can obtain such 1/f fluctuation waveform as in FIG. 4. This is just one example of 1/f fluctuation waveform, and not limitative.

The waveform shown in FIG. 4 includes several minute waveform components with irregular frequencies and periodicities and the like. If the motor (M5) is controlled under this fluctuation waveform, the control per se thereof becomes unexpectedly so rapid that the associated mechanic elements of lumbar support device (24) are not acted responsive thereto.

In accordance with the present invention, such problem is solved by creating a quasi fluctuation waveform outlining the initially synthesized waveform of finely jagged shape in such a simplified manner as to delete most of minute irregular frequencies and periodicities that can not be transformed by the motor (M5) into actual motions of the mechanic elements of lumbar support device (24). Further, in accordance with the invention, the quasi fluctuation waveform presents various waveform sections of different amplitudes as time passes, and on the basis thereof, a time table, as exemplified in Tables 2 and 3 below, is prepared for controlling the drive of motor (M5) in order to effect a proper fore-and-aft repeated motion of lumbar plate (28) with a good fluctuation. Namely, a distance at which the lumbar plate (28) is moved and a time therefor are respectively set in the form of numeral value, per step.

TABLE 2

| Step (n) | Time (Ts) (sec.) | Distance (Ln) (mm) |
|---|---|---|
| 0 | 0.00 | 34.10 |
| 1 | 0.07 | 40.00 |
| 2 | 2.34 | 29.40 |
| 3 | 3.98 | 33.80 |
| 4 | 6.55 | 21.20 |
| 5 | 7.25 | 21.20 |
| 6 | 8.18 | 13.50 |
| 7 | 9.11 | 19.70 |
| 8 | 10.04 | 13.50 |
| 9 | 10.98 | 23.20 |
| 10 | 12.38 | 7.60 |
| 11 | 14.72 | 27.00 |
| 12 | 15.19 | 27.00 |
| 13 | 16.36 | 35.30 |
| 14 | 18.98 | 16.70 |
| 15 | 21.73 | 16.70 |
| 16 | 23.60 | 26.20 |
| 17 | 24.30 | 20.60 |
| 18 | 25.47 | 23.50 |
| 19 | 26.17 | 23.50 |
| 20 | 27.11 | 30.30 |
| 21 | 28.40 | 22.30 |
| 22 | 28.97 | 26.70 |
| 23 | 30.14 | 13.80 |
| 24 | 31.78 | 21.80 |
| 25 | 32.71 | 11.20 |
| 26 | 33.41 | 14.70 |
| 27 | 34.58 | 14.70 |
| 28 | 36.22 | 21.80 |
| 29 | 37.38 | 8.20 |
| 30 | 37.84 | 17.00 |
| 31 | 39.94 | 13.80 |
| 32 | 40.87 | 13.80 |
| 33 | 41.57 | 21.70 |
| 34 | 42.73 | 13.80 |
| 35 | 43.19 | 23.50 |
| 36 | 44.13 | 20.20 |
| 37 | 44.83 | 20.20 |
| 38 | 46.00 | 13.50 |
| 39 | 47.16 | 23.50 |
| 40 | 48.33 | 20.30 |
| 41 | 49.49 | 24.70 |
| 42 | 50.66 | 15.90 |
| 43 | 51.12 | 24.40 |

TABLE 3

(continued from TABLE 2)

| Step (n) | Time (Ts) (sec.) | Distance (Ln) (mm) |
|---|---|---|
| 44 | 52.76 | 23.20 |
| 45 | 53.92 | 23.20 |
| 46 | 54.85 | 12.30 |
| 47 | 55.55 | 19.40 |
| 48 | 56.48 | 12.30 |
| 49 | 57.18 | 17.30 |
| 50 | 57.88 | 9.40 |
| 51 | 58.81 | 13.20 |
| 52 | 59.51 | 8.20 |
| 53 | 60.44 | 11.50 |
| 54 | 61.61 | 7.40 |
| 55 | 63.48 | 14.70 |
| 56 | 65.35 | 0.00 |
| 57 | 66.28 | 20.20 |
| 58 | 67.22 | 11.80 |
| 59 | 67.69 | 15.90 |
| 60 | 68.85 | 15.90 |
| 61 | 69.78 | 7.10 |
| 62 | 70.48 | 17.60 |
| 63 | 71.42 | 10.30 |
| 64 | 72.58 | 22.60 |
| 65 | 73.02 | 22.60 |
| 66 | 75.12 | 26.50 |
| 67 | 76.76 | 17.90 |
| 68 | 77.92 | 25.00 |
| 69 | 78.62 | 25.00 |
| 70 | 79.32 | 27.60 |
| 71 | 79.78 | 21.80 |

TABLE 3-continued (continued from TABLE 2)

| Step (n) | Time (Ts) (sec.) | Distance (Ln) (mm) |
|---|---|---|
| 72 | 81.65 | 26.20 |
| 73 | 82.35 | 26.20 |
| 74 | 82.81 | 23.80 |
| 75 | 83.98 | 26.50 |
| 76 | 84.44 | 26.50 |
| 77 | 85.14 | 33.20 |
| 78 | 85.84 | 30.30 |
| 79 | 86.77 | 36.80 |
| 80 | 87.71 | 20.60 |
| 81 | 88.54 | 34.10 |

Figure 5:
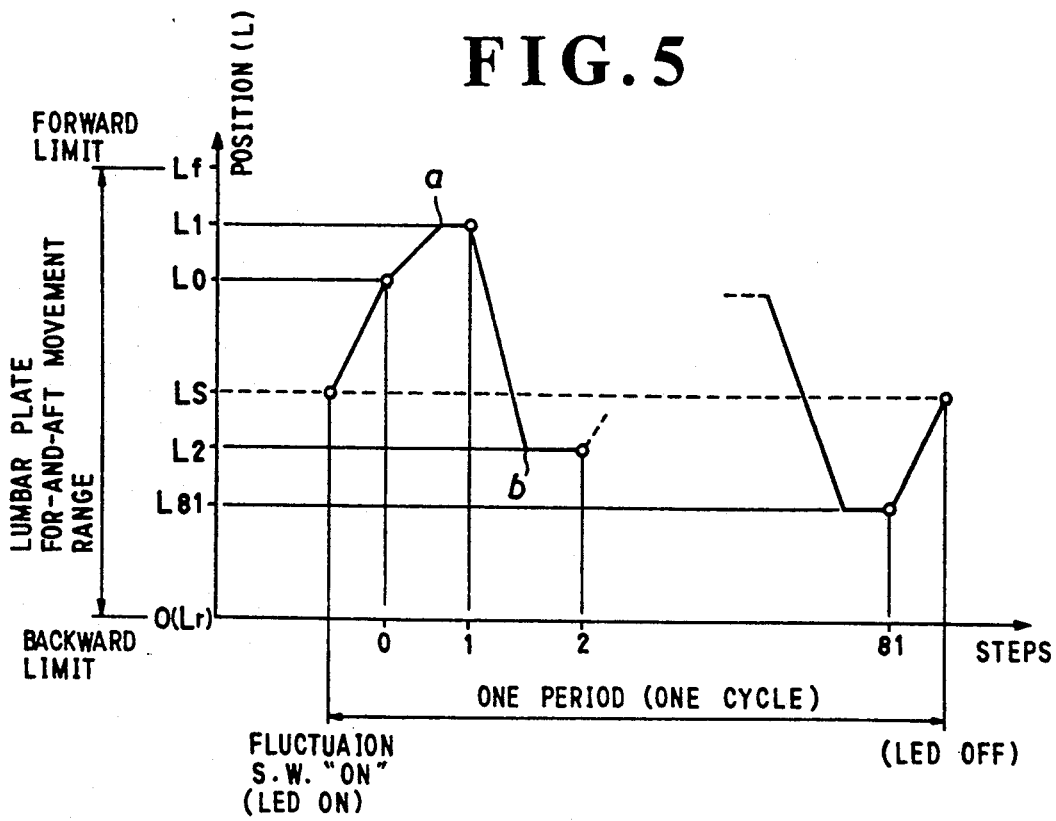
FIG. 5 is a schematic graph showing a motion of the lumbar plate under a fluctuation control mode.

As understandable from Tables 2 and 3 above, and FIG. 5, the one period of the quasi fluctuation waveform, i.e. one cycle at which the lumbar plate (28) is moved forwardly and backwardly in a fluctuation manner according to the quais fluctuation wave form, may be segmented in as many steps as possible; i.e. from step "0" to step "81" as shown.

It should be noted here that the "time" in the Table 2 and 3 refers to an accumulated time to be counted up from a first time in step "0", and the "distance" in the same table refer to the "position (L)" in FIG. 5, which indicates a position of the lumbar plate (28) from the backward limit point.

Figure 6:
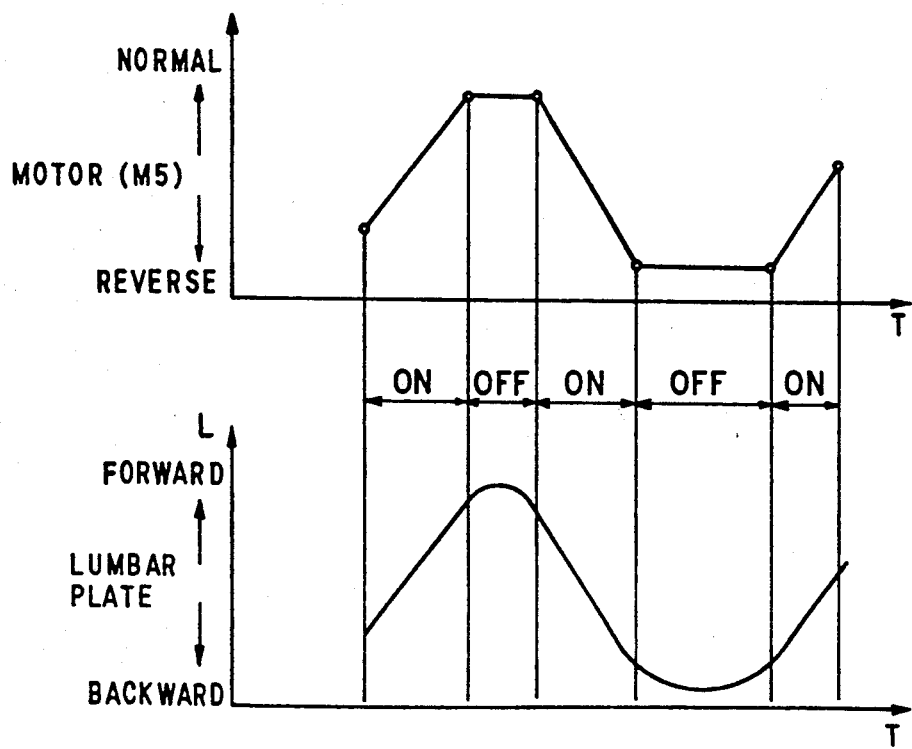
FIG. 6 is a combination of two graphs each showing the drive direction of motor (M5) and corresponding motion of the lumbar plate, respectively.

Referring to FIG. 6, it is seen from the upper graph therein that the motor (M5) is controlled its drive by the on-off switching operation of drive circuit (30), which gives a non-continuous (non-smooth) touch to the fore-and-aft movement of lumbar plate (28) per point of inflection within the motor (M5) responsive to the on-off switching operation. To eliminate such undesired touch, there is provided an elastic element of spring nature in the relevant portion of the lumbar support device (24), although not shown, so as to absorb the non-continuous movement of lumbar plate (28) at the inflection point in such a manner as to allow the lumbar plate (28) to represent such continuous or smooth series of motions in the fore-and-aft direction against a lumbar part of passenger on the seat. This is shown in the lower graph in FIG. 6. Therefore, the lumbar plate (28) is moved without giving any intermittent sense, yet with varied shades of pressing degrees, towards and away from the lumbar part of the passenger.

This 1/f-fluctuation-waveform based control for the lumbar plate (28) is effected through the CPU (14) by operation of the fluctuation switch (58). The switch (58), as shown in FIG. 2, is of a self-return, pushtype switch which is incorporated in the switch unit (12). Designation (60) denotes an indication element associated with this fluctuation control, which serves to indicate and notify that the control is being carried out. As shown, the element (60) is a light emitting diode (LED) connected with the CPU (14), with the arrangement thereof being such that the LED (60) will keep "on" or blinking during a time from a starting point of operating the switch (58) until one cycle of the lumbar plate fluctuation control is completed. Preferably, the color of light for this particular LED should be distinguished from that for the foregoing burst control LED (54) to avoid an error in making choice between the burst and fluctuation controls.

The motor control device (10) is further arranged such that a first position of lumbar plate (28), at the point when operating the fluctuation switch (58), is stored in memory as a home or initial position (Ls), and then, after having completed the fluctuation control, the lumbar plate (28) is automatically returned to a position corresponding to that initial position (Ls) through control of motor (M5), as shown in FIG. 5. Specifically, the initial position (Ls) of lumbar plate (28) is detected by the potentiometer (50), which emits a detection value to the CPU, and the detected value is memorized therein as the initial position. Then, at the completion of fluctuation control, a comparison is made between the present position (Ln) and the initial position (Ls) so as to calculate out an amount or distance at which the lumbar plate (28) is moved in its fore-and-aft direction, and the motor (M5) is caused to be driven an mount corresponding to that distance, whereby the lumbar plate (28) is automatically returned to a position corresponding to the foregoing initial position.

In accordance with the present invention, it is still further so arranged that, from the above-noted initial position (Ls), the drive amount of motor (M5) and time (Ts) are respectively varied per step as shown in the Tables 2 and 3, and that each of those motor drive amount and time is corrected under a correction factor (K). The correction factor (K) is a ratio between a backward limit point (i.e. a reference position) of the lumbar plate (28) and various positions of the same within its predetermined fore-and-aft movable range. Thus, letting the forward limit point and initial position of the lumbar plate (28) be represented by (Lf) and (Ls), respectively, the correction factor (K) is expressed by "Ls/Lf", which implies that the correction factor (K) is increased as the lumbar plate position (Ls) is closer to the forward limit point (Lf), while the same factor (K) is decreased as the position (Ls) is closer to the backward limit point on the other hand. On the basis of such correction factor (K), the time (Ts) and drive amount of motor (M5) are each calculated with respect to the initial position (Ls), so that the increase and decrease of the former two values are in a proportional relation with the latter. Accordingly, irrespective of the initial position (Ls) being changed, the lumbar plate (28) keeps to assume the smooth fluctuation motion in the fore-and-aft direction, because a certain similarity relation is maintained between the quasi fluctuation waveform and the lumbar plate movement.

Now, a description will be made of a method for controlling the lumbar plate (28) with the above-described motor control device (10) according to each of the burst and fluctuation control modes. Namely, referring to the waveform graphs in FIGS. 3 and 5 as well as the time tabel in Tables 2 and 3, the steps involved in the present invention will be specified along the burst control routine in FIGS. 7 to 9 and then the burst control routine in FIGS. 10 to 13.

Figure 7:
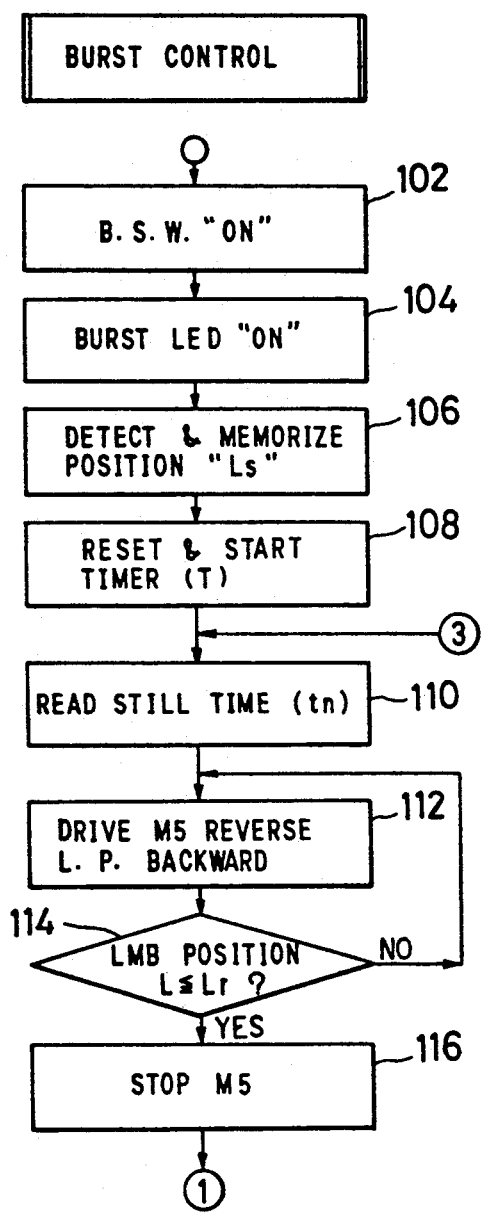
FIG. 7 is a flow chart showing a burst control routine in a motor control method in accordance with the invention.
Figure 8:
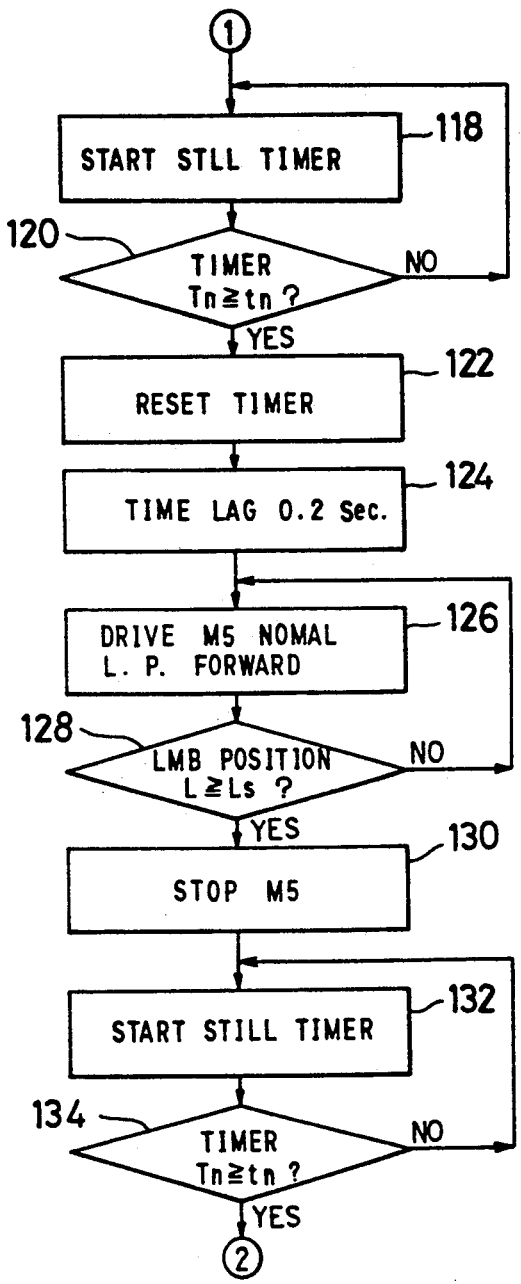
FIG. 8 is a flow chart showing a subsequent flow of the burst control routine.

At first, referring to FIG. 7, when the burst control mode is selected at (102) by turning on the burst switch (B.S.W.), the LED indicator (54) lightens to notice that the burst control is carried out, at block (104). Then, at the next block (106), the present position of the lumbar plate (28) is detected and stored in memory as a home or initial position which is a position where the lumbar plate (28) is pressed against a lumbar part of a passenger on the seat. At the same time, a timer (T) is reset, which times and sets one period (one cycle) of the burst control, at (108) (see FIG. 3 also). Thereafter, the burst control starts to be effected.

Step is then led to the block (110) wherein the CPU (14) reads and stores a time (tn) for keeping still the lumbar plate (28), which time (tn) is called short as "still time" in the drawings and has been set by the selection switch (56) before, and at the next block (112), the motor (M5) is driven in the reverse direction so as to cause the lumbar plate (L.P.)(28) to move backwardly with respect to the seat back (26). After then, it is checked up, at (114), whether or not the present position (L) of lumbar plate (28) reaches the backward limit point (Lr) within the fore-and-aft movable range. That is, as far as the lumbar plate (28) reaches the backward limit point (Lr), the answer "NO" remains given at that block, during which the motor (M5) continues its drive for keeping the backward movement of lumbar plate (28). When the lumbar plate (28) reaches the backward limit point (Lr), "YES" is given at the block (114), thus leading the step to the block (116) at which the motor (M5) is stopped. Now, step is led to a block (118) in FIG. 8, at which started is a timer for timing a time for keeping still the lumbar plate (28) (which is called short as "still timer" in the drawings), so as to keep still the lumbar plate (28) at the backward limit point (see FIG. 3). At block (120), it is checked up whether or not the time (Tn), which is timed by the still timer (28), passes over a preset time (tn) for keeping still the lumbar plate (28). Here, until the former (Tn) passes over the latter (tn), the answer "NO" remains given in that block (120) to permit the timer (28) to keep timing the time further. Thereafter, when the timer's time (Tn) exceeds the lumbar-plate-suspending time (tn), then "YES" is decided at the block (12), and the timer (28) is reset at (122), while 0.2 sec time lag is set at (124). At the next block (126), the motor (M5) is driven in the normal direction so as to cause the lumbar plate (28) to move forwardly relative to the seat back (26).

Next, at (128), it is determined whether the present position (L) reaches the pressing position (Ls) or not, at which step, the decision "NO" remains given until the former (L) reaches the latter (Ls), thereby causing the motor (M5) to continue its drive for keeping the lumbar plate (28) to move forwardly. When the lumbar plate (28) reaches the pressing position (Ls), "YES" is decided at the block (128), leading the step to the next block (130) for stopping the motor (M5), thereby placing the lumbar plate (28) in that pressing position, while simultaneously the timer (tn) starts to work at a block (132).

It is then checked up, at (134), whether the timer's time (Tn) passes over the time (tn), the decision "YES" is made at (134).

Figure 9:
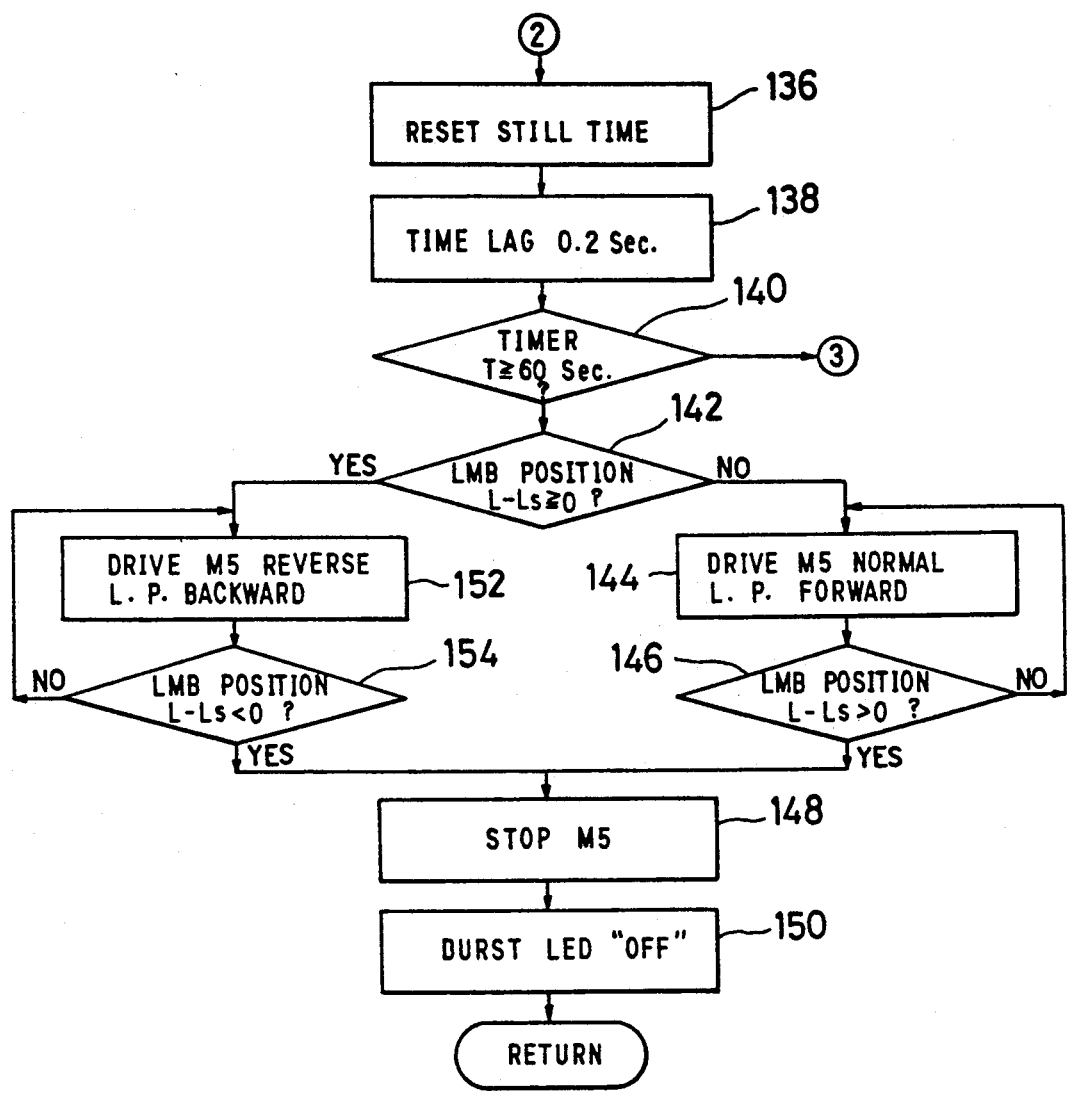
FIG. 9 is a flow chart showing a subsequent flow of the burst control routine.

Then, the step goes to a block (136) in FIG. 9, wherein the timer for keeping still the lumbar plate (still timer) is reset, and at (138), 0.2 sec. time lag is given. After then, a determination is made at (140) as to whether the timer's time (T) passes over 60 sec. or not, and at this step, "NO" decision remains given until the time (T) passes for 60 sec., during which the step is returned to the block (110) in FIG. 7, and again undergoes the same series of procedures from the blocks (110) to (116) in FIG. 7, through the blocks (118) to (134) in FIG. 8, up to the blocks (136) to (138) in FIG. 9, thereby controlling the motor (M5) to cause the lumbar plate (28) to be repeatedly moved forwardly and backwardly between the pressing position (Ls) and backward limit point (Lr).

After lapse of 60 sec. time, "YES" is decided at the block (140), which leads the step to a next block (142). At this block (142), a comparison is made concerning the position of lumbar plate (28); namely, as to a difference between its present position (L) and pressing position (Ls) (i.e. initial position). Otherwise stated, if the CPU (15), on the basis of the related graph in FIG. 3, recognizes that the present position (L) of lumbar plate (28) is located behind the pressing position (Ls) and thus the formula, "L−Ls≧0", is established, then "NO" is decided at that block (142), thus leading the step to a block (144) wherein the motor (M5) is driven in the normal direction so as to cause the forward movement of the lumbar plate (28)(L.P.). Thereafter, at a block (146), it is ascertained whether the present position (L) of the lumbar plate (28) exceeds the initial position (Ls) or not, and at this step, the motor (M5) continues its drive until the lumbar plate (28) is moved past the initial position (Ls). If "YES" is decided at this block (146), the motor (M5) is stopped, as indicated at (148), thereby causing the lumbar plate (28) to be located at a position corresponding to the initial position (Ls). Then, at the last block (150), the burst LED indicator is turned off to notice the completion of the burst control.

On the other hand, at the stage where one cycle of the burst control is finished (i.e. when the time 60 sec. is lapsed), if the CPU (15) recognizes that the present position of lumbar plate (28) is located before the initial position (Ls), whereupon the formula, "L−Ls≧0" is established, then the answer "YES" is given at the block (142), which leads the step to another block (152), wherein the motor (M5) is driven in the reverse direction so as to cause backward movement of the lumbar plate (28). Thereafter, at block (154), it is ascertained whether the present position (L) of lumbar plate exceeds the initial position (Ls) or not, and at this step, the decision "NO" remains given there until the lumbar plate (28) is moved past the initial position (Ls), thus keeping the motor (M5) at work. If "YES" is answered at the block (154), the motor (M5) is immediately stopped, as indicated at next block (148), to locate the lumbar plate (28) at a position corresponding to the initial position (Ls). Then, the burst LED is turned off at (150) to notice the completion of the burst control.

It is to be appreciated from the above description that the burst control provides a repeated pressing action of the lumbar plate (28) against the lumbar part of a passenger on the seat, thus functioning to give a massage effect thereto, so that a fatigue in the passenger's lumbar part may be reduced, which is advantageous in retaining such ideal reverse "S" shape of vertebra as discussed previously.

Figure 10:
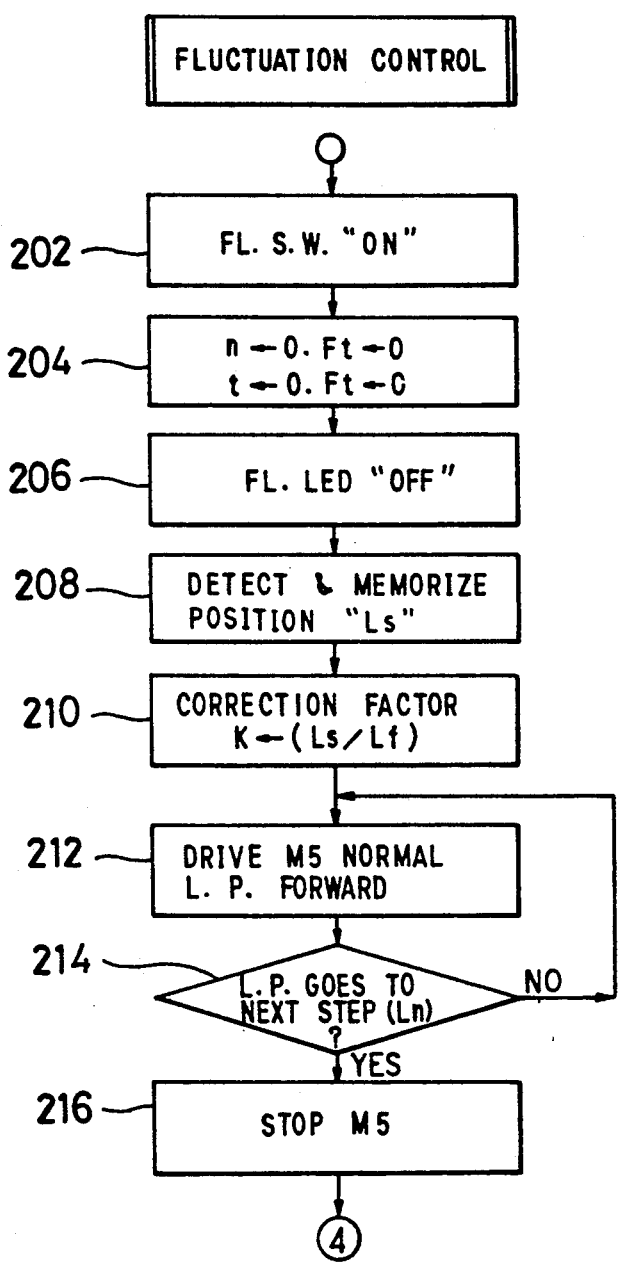
FIG. 10 is a flow chart showing a fluctuation control routine in the motor control method.

Referring now to FIG. 10, the fluctuation control mode may be selected by operation of the fluctuation switch (FL.S.W.)(58). If the switch (58) is turned on, as at block (202), the step begins with a resetting procedure wherein the steps (n) in the time table as shown in the Tables 2 and 3 are reset to "0", ant a time flag (T), a subsequent step indication flag (Fl) and a time lapse indication flag (Ft) are respectively reset to "0", at the next block (204). At this point, the fluctuation LED indicator (60)(FL. LED) is lightened to notice a commencement of the fluctuation control procedures, at (206).

Then, the step proceeds from a block (208), where the position of the lumbar plate (28) is detected in its fore-and-aft movement direction by means of the potentiometer (50) and stored in memory in the CPU (14) as an initial position (Ls) (see FIG. 5). At next block (210), a correction factor (K) is computed in correspondence with the initial position (Ls), so that a given distance (Ln) at which the lumbar plate (28) is moved, per step (n), as shown in the time table in Tables 2 and 3, is corrected under such correction factor (K). Thus, as indicated at next block (212), firstly, the lumbar plate (28) is caused by the normal drive of motor (M5) to be moved forwardly towards a position corresponding to a first distance (L0) at a first step (0) as indicated in the Table 2.

Then, at a block (214), it is determined whether the lumbar plate (28) has been moved a first distance (L0) in the first step (0) and is ready to undergo a next step (1), or not; namely, whether the lumbar plate (28) has been moved a first distance to further step (Ln), or not. At this stage, "NO" remains given there until the lumbar plate (28) has moved the first distance (L0). If the lumbar plate (28) has reached a position covering such distance (L0), the decision "YES" is given at the block (214), and thus the step goes to a next block (216) for causing the motor (M5) to stop its drive. At this block (216), as the control of lumpar plate (28) goes to a next step (1), the CPU (14) corrects the stopped position of lumbar plate (28) on the basis of the correction factor (K) into the first position corresponding to the first step (0) (See FIG. 5). Thereafter, the step is led to a block (218) in FIG. 11, where 0.2 sec. time lag is given after the stop of motor (M5). At next block (220), the CPU (14) computes the number of steps by adding 1 to the step; i.e "n 1". Then, at block (222), a comparison is made between one lumbar plate position (Ln) at one step (n) and another lumbar plate position (Ln+1) at another step (n+1). Hence, at this point, a comparison is made between the first position (L0) at the first step (0) and the second position (L1) at the second step (1). Now, as can be seen from Table 2 and FIG. 5, the present position (L0) of lumbar plate (28) is located behind the second position: "L0<L1", which is therefore recognized by the CPU (14) as "Ln<Ln+1". Thus, the step goes to a block (224) in FIG. 12, where it is determined whether or not the subsequent step indication flag (Fl) is set to "1". At this point, since the lumbar plate (28) is located at the first position (L0) at the first step (0), the flag (Fl) is in a reset state (i.e. reset to "0"), and "NO" is decided at that block (224). Then, at block (226), the motor (M5) is driven in the normal direction so as to cause the lumbar plate (28) to move forwardly. Although not shown, at that time, a timer starts to count time.

At (228), it is determined whether the present position (L) of lumbar plate (28) reaches another next position (Ln); i.e. the second position (L1), or not. Here, normally in view of the fact that the present position (L) does not yet reach the second position (Ln), the answer at the block (228) is "NO", thus leading the step to a next block (230) for determining whether the time (M.T.), which has been counted so far by timer, exceeds a given reference time, or not. Here, the time (M.T.) means a time that has passed from a point of time (tn) at the preceding step (n) to another point of time (tn+1) at the subsequent step (n+1), and therefore, in the CPU (14), the following formula; "(tn+1−tn)×K", is set as the foregoing reference time. At this stage (230), until the timer's time (M.T.) exceeds such reference time, the negative answer "NO" remains given there, thus returning the step to the precedent block (224).

Then, the lumbar plate (28) is moved forwardly by the normal drive of motor (M5), and when the lumbar plate (28) reaches the second position (L1) at the second step (1), as indicated by "a" in FIG. 5, the decision "YES" is made at the block (228), and at next block (232), the flag (Fl) is set to "1". Thus, the motor (M5) is stopped at the subsequent instruction block (234), and thereafter, it is ascertained at block (236) whether the flag (Fl) has been set to "1" or not. At this moment, if the timer's time (M.T.) has not yet exceeded the reference time, the time lapse indication flap (Ft) is still in the reset state (i.e. Ft=0), which gives "NO" answer at the block (236) and the step is again returned to the block (224) for determining whether or not the subsequent step indication flag (Fl) is set to "1".

When the flag (Fl) is set to "1", giving "YES" answer at the block (224), a determination is made at (230) as to whether the timer's time (T.M.) exceeds the reference time or not. In the event that the timer's time (T.M.) exceeds the reference time and all the conditions for the next step (1) are satisfied, the affirmative answer "YES" is given at that block (230) and then, at (238), the flag (Ft) is set to "1", which leads the step again to the block (234) for stopping the motor (M5) and further again to the block (236) for ascertaining whether the flag (Ft) has been set to "1" or not. Now that the flag (Ft) has been set to "1", "YES" is decided at that block (236), and then the step undergoes the resetting block (240) in FIG. 11, wherein both flags (Fl) and (Ft) are reset to "0", after which, at (242), it is determined whether the number of steps (n) reaches "81" or not. At this stage, "NO" remains given there until the steps (n) are taken on to such final number "81", thus returning the step to the precedent block (218) in FIG. 11. Hence, until the final step (81), the step proceeds from the block (218) wherein 0.2 sec. time lag is given, and undergoes a next step (n+1); namely, a third step (2), after which, again, a comparison is made, at (222), between the present position (L1) and the third position (L2), of the lumbar plate (28), so as to determine a position of the lumbar plate (28) relative to the position (L1). Now, reference is made to FIG. 5 and Table 2, from which it is seen that the lumbar plate third position (L2) at the third step (L2) is located behind its second position (L1). This means L1>L2, considering the block (222) in FIG. 11, which is therefore recognized by the CPU (14) as "Ln>Ln+1". Consequently, the step is led therefrom to the block (244) wherein it is determined whether the flag (Fl) is set to "1" or not. Since "NO" is decided there, the motor (M5) is driven in the reverse direction so as to cause the lumbar plate (28) to be moved backwardly, as in the block (246).

Then, at (248), it is ascertained whether the lumbar plate (28) reaches the third position (L2), or not. As the lumbar plate (28) does not reach the position (L2), the negative decision "NO" is given there, and then, at next block (250), whether or not the timer's time (M.T.) exceeds the reference time [(tn+1−tn)×k] is determined. At this point, "NO" remains given there until the former time passes over the later time, thereby returning the step to the precedent block (244).

When the lumbar plate (28) reaches the third position (L2) at the second step (2) as indicated by "b" in FIG. 5, "YES" is decided at that block (248), whereupon the step goes to the block (252) wherein the flag (FL) is set to "1", and then at (254) an instruction to stop the motor (M5) is given. But, it is checked up at (256) whether the time lapse indication flag (Ft) is set to "1" or not. At this moment, this flag (Ft) is reset to "0" and thus "NO" is answered there, so that the step is returned to the precedent block (244). After then, with the flag (FL) set to "1", the answer at that block (244) is "YES", and thus, at (250), it is again decided whether the timer's time (T.M.) exceeds the reference time, or not. If "YES" is answered there, all the conditions for the second step (2) are satisfied, whereupon the step undergoes the blocks (258) and (254) for setting the flag (Ft) to "1" and giving an instruction to stop the motor (M5) again. At the next step (256), "YES" is now decided, thereby resetting both flags (FL)(Ft) to "0" at (240). At the block (242), it is again checked up whether the number of steps (n) reaches "81" or not. At this point, "NO" is decided there, thus once again returning the step to the precedent block (218). The step again undergoes the blocks (218), (220) and (222). With regard to the block (222), referring to Table 2, the present third position (L2) and the next fourth position (L3) of lumbar plate (28) are compared with each other to result in "L2<L3", which is therefore recognized by the CPU (14) as "L1<Ln+1". Consequently, as can be seen from the blocks (224) and (226) in FIG. 12, the motor (M5) is driven in the normal direction so as to again cause the lumbar plate (28) to be moved forwardly.

Figure 11:
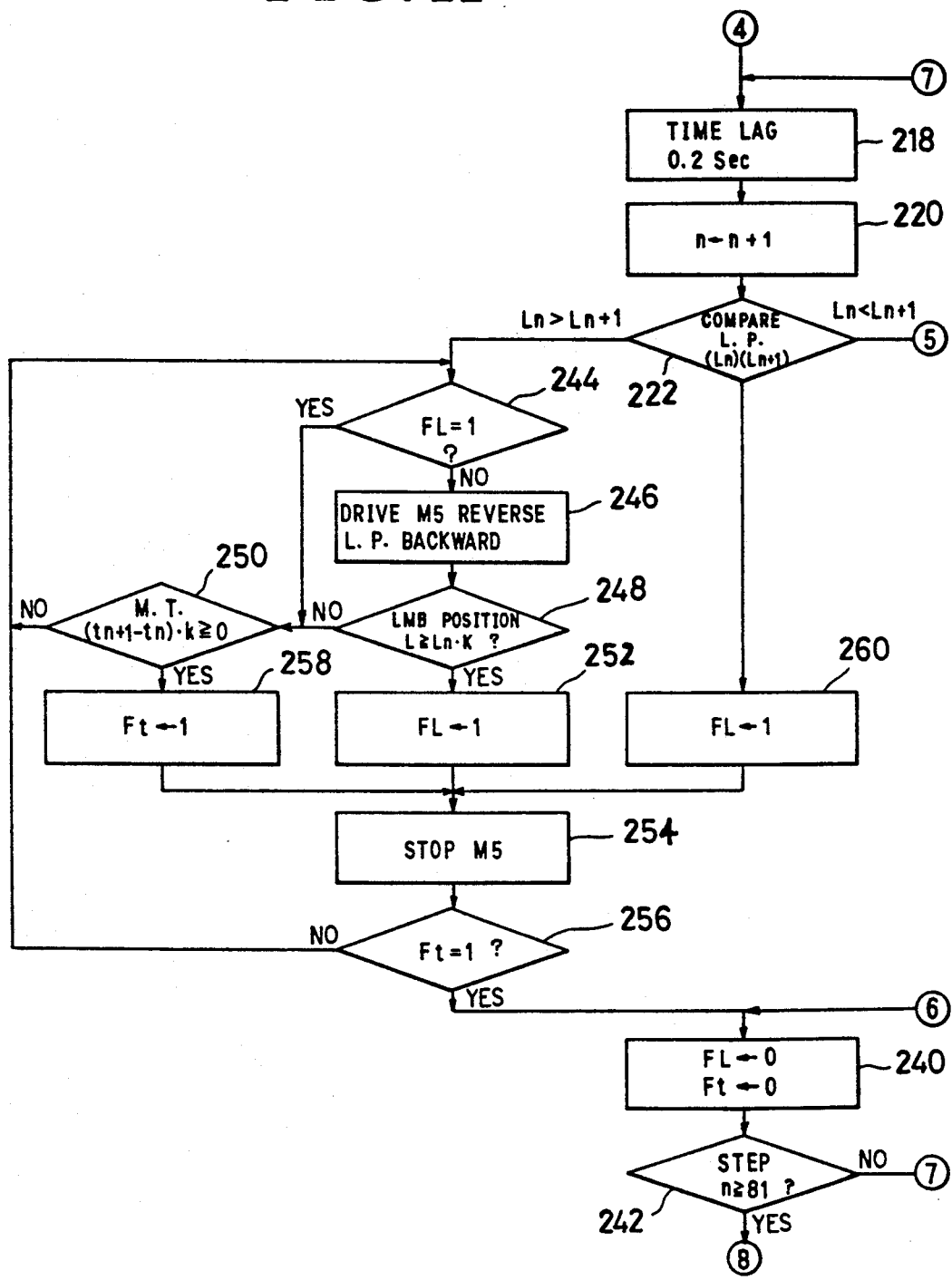
FIG. 11 is a flow chart showing a subsequent flow of the fluctuation control routine.
Figure 12:
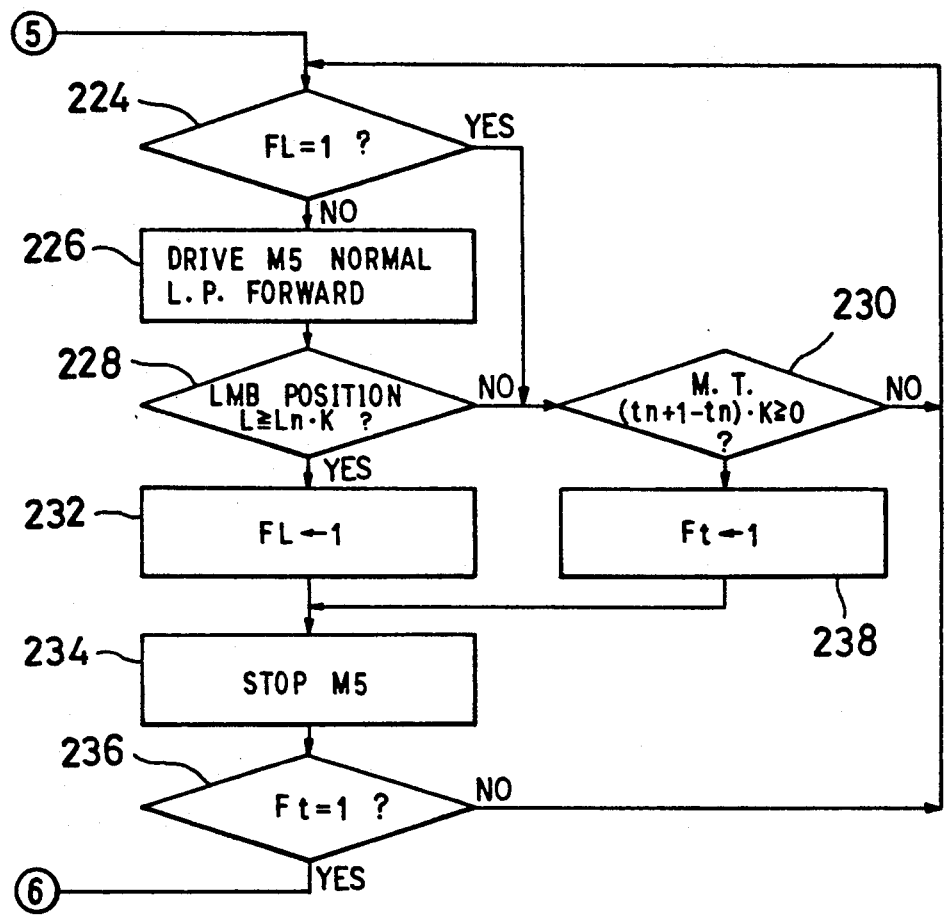
FIG. 12 is a flow chart showing a subsequent flow of the same fluctuation control routine.

During the above-described series of lumbar plate movements until the final step "81", if the present position (Ln) at one step (n) coincides with a subsequent position (Ln+1) at another step (n+1), a decision at the block (222) in FIG. 11 is: "Ln=Ln+1", and then the flag (FL) is set to "1" at a next block (260), so that at (254) a "stop" instruction is given to the motor (M5). In other words, in this particular case, the motor (M5) will not work, and will keep in an inoperative state until the timer's time (T.M.) exceeds the reference time, giving "YES" answer at the block (250).

Figure 13:
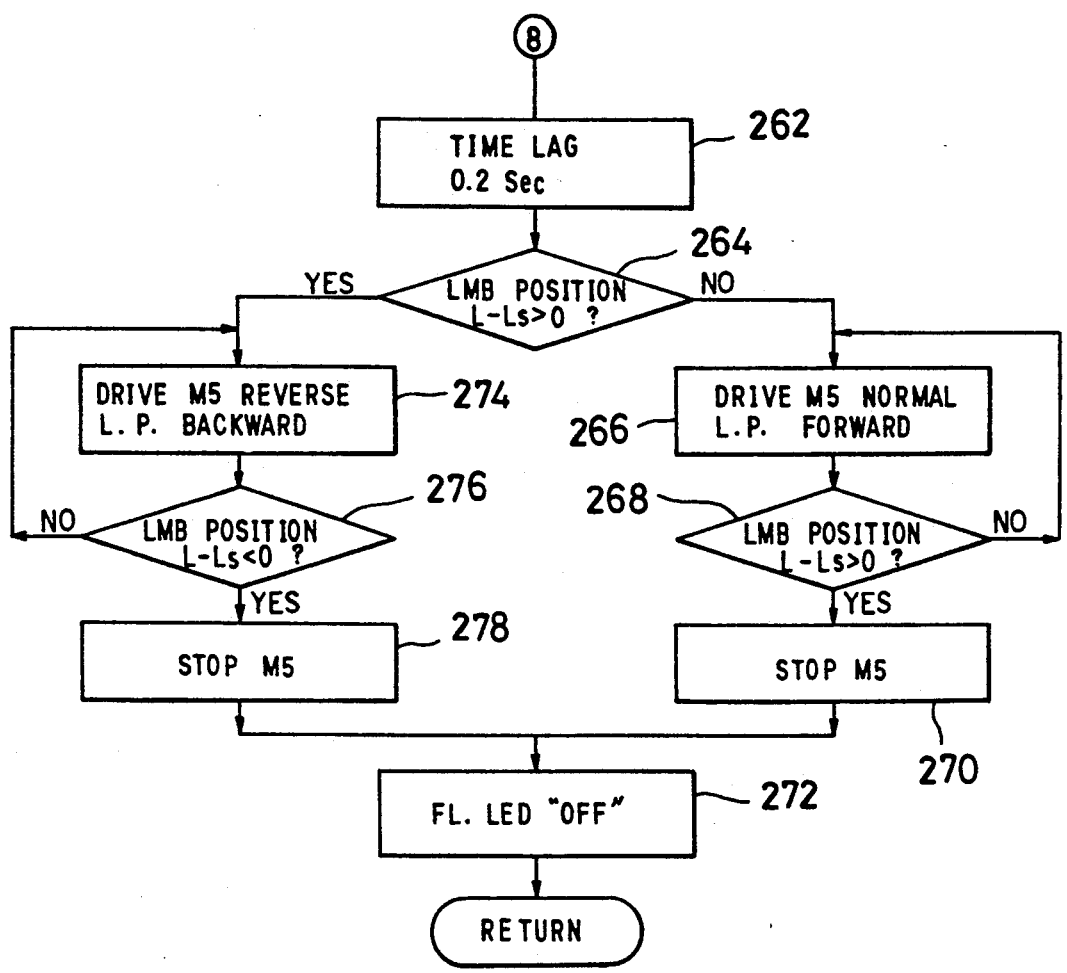
FIG. 13 is a flow chart showing a subsequent flow of the same fluctuation control routine.

In this way, the operation of the motor (M5) is controlled along the steps in the Tables 2 and 3, to thereby repeat the fore-and-aft movement of the lumbar plate (28), and then, when one cycle of the fluctuation control is completed, with the number of steps (n) reaching "81", the answer at (242) in FIG. 11 is "YES" whereupon the step goes to a series of procedures in FIG. 13, in which, at (262), 0.2 sec time lag is provided, and then at (264), it is determined whether or not the present position (L) of lumbar plate (28) (LMB) is located before the initial position (Ls). As shown in FIG. 5, if the present position (L); namely the 82nd position at the 82nd step (i.e. step "81"), is located behind the initial position (Ls), then "NO" is decided at the block (264), so that, at (266), the motor (M5) is driven in the normal direction to cause the lumbar plate (28) to be moved forwardly. At a next block (268), it is determined whether the foregoing present position (L) exceeds the initial position (Ls) or not. Here, the motor (M5) will continue its drive until "YES" is given at that block (168). Then, when "YES" is answered there, the motor (M5) is stopped at (270), whereupon the lumbar plate (28) is returned to a position corresponding to the initial position (Ls), and the fluctuation LED indicator (60) is turned off at (272), noticing that the fluctuation control of lumbar plate (28) has been completed. On the other hand, if the present 82nd position (L) of lumbar plate (28) is located before the initial position (Ls), at the block (264), the CPU (14) determines this state to be: "L−Ls>0" and gives "YES" decision there, so that the motor (M5) is driven reversely so as to move the lumbar plate (28) backwardly at (274). At a next block (276), it is determined whether the present 82nd position (L) exceeds the initial position (Ls), or not. Here, the motor (M5) will continue be driven until "YES" is given there. When "YES" is answered at that block (276), the motor (M5) is stopped, as at (276), thereby causing the lumbar plate (28) to be returned to a position corresponding to the initial position, at (278), and turning off the fluctuation LED indicator (60), at (272), noticing the completion of the fluctuation control.

In the present embodiment, operation of the selection switch (36) changes over the time for keeping still the lumbar plate (28) under the burst control mode, but this is not limitative, and it may be arranged such that the burst control is effected in a certain preset time for keeping still the lumbar plate (28).

In the present embodiment, the lumbar plate (28) is automatically returned to the initial position after completion of one cycle of both burst and fluctuation controls under the control of motor (M5), but, this is not limitative either.

Accordingly, it is to be appreciated according to the present invention that the following advantageous effects are produced:

(i) Selecting the automatic control mode permits a proper series of fore-and-aft movements of lumbar plate (28) against the lumbar part of a passenger on the seat, which serves to provide a massage effect thereto for helping the passenger to maintain such ideal reverse "S" shape of vertebra, with a comfortable seating posture and alleviating his or her fatigue during a long period of seating in the seat.

(ii) One of the burst and fluctuation control modes may be selected to provide a periodic pressing effect or an aperiodic fluctuation pressing effect, depending on a degree of fatigue or taste of a passenger on the seat, which avoids any objectionable touch as found in the prior art.

(iii) After completion of lumbar plate control, the lumbar plate is automatically returned to a position corresponding to the initial position (Ls). This always presents a proper position of lumbar plate to a passenger each of the initial stage for effecting the lumbar plate control, and thus prevents deformation of his or her shape of vertebra.

(iv) The fluctuation control in the present invention is effected according to a predetermined number of numerical values, as shown in Tables 2 and 3 above, which are obtained by computing a quasi fluctuation waveform that outlines a 1/f Fourier-series-based, synthesized waveform, excluding most of minute irregular frequencies and periodicities therefrom. This prevents abnormal rapid drives of motor (M5) and eliminates the need to reinforce the peripheral mechanic elements for the motor (M5) with an increased number of parts and intricate elements.

While having described the present invention as above, it should be understood that the invention is not limited to the illustrated embodiment, but any other modifications, replacements and additions may be applied thereto without departing from the scopes of the appended claims. For example, the indicators (54)(60) may comprises a bell or buzzer. The motor control device (10) may be provided in any other kinds of seats insofar as they include the lumbar support device (24). The backward position of lumbar plate (28) in its fore-and-aft movement range may be set at any of such positions that do not cause the lumbar plate (28) to press against the lumbar part of a passenger, instead of the backward limit point: Namely the lumbar plate backward position may be defined anywhere it is located behind the initial position (Ls).

What is claimed is:

1. A method for controlling a lumbar support device in a powered seat, in which said lumbar support device includes a lumbar plate for pressingly supporting a lumbar part of an occupant on the seat, and a motor, which is adapted to cause a fore-and-aft movement of said lumbar plate relative to a seat back of said powered seat, said motor is controlled under a plurality of motor drive control modes, said method comprising the steps of:

providing, as one of said motor drive control modes, a manual control mode allowing said occupant to manually control a drive of said motor to apply to predetermined lumbar support force to said lumbar part of said occupant;

providing, as one of said motor drive control modes, a burst control mode for controlling said drive of said motor so as to effect said fore-and-aft movement of said lumbar plate in a periodic way;

providing, as one of said motor drive control mode, a fluctuation control mode for controlling said drive of said motor so as to effect said fore-and-aft movement of said lumbar plate in an aperiodic way;

wherein said burst and fluctuation control modes are effected in an automatic control mode;

permitting a selection to be done for one of said burst and fluctuation control modes;

causing said motor, if said burst control mode is selected, to be driven by operation of a burst switch means in a generally periodic way, with a pause time given per period, so as to repeat said fore-and-aft movement of said lumbar plate in said generally periodic way for a predetermined time, such that said lumbar plate is kept still per said pause time within said predetermined time; and causing said motor, if said fluctuation control mode is selected, to be driven by operation of a fluctuation switch means in said aperiodic way for a predetermined time so as to repeat said fore-and-aft movement of said lumbar plate in conformity with said aperiodic way, within a predetermined fore-and-aft movement range;

wherein, in said fluctuation control mode, the aperiodic drive of said motor is effected according to a predetermined number of drive times and a predetermined number of drive amount, both of which are set on a basis of a predetermined number of frequency portions and a predetermined number of period portions which are both obtained from a 1/f fluctuation waveform synthesized under a predetermined Fourier series.

2. The method as defined in claim 1, wherein said pause time for keeping still said lumbar plate under said burst control mode is set selectively at one of preset plural sorts of times by a selection switch means.

3. The method as defined in claim 1, wherein said method further includes the steps of:

detecting a position of said lumbar plate within said fore-and-aft movement range, prior to said motor control modes being executed;

storing in memory said position as an initial position; then executing said motor control modes;

making a comparison between a present position of said lumbar plate and said stored initial position of the same; and causing said motor to be automatically returned to a position corresponding to said initial position.

4. The method as defined in claim 1, wherein said method further includes the steps of:

preparing a quasi fluctuation waveform which outlines said 1/f fluctuation waveform in such a manner as to exclude most of minute irregular frequency and period portions therefrom;

then, computing out, on basis of said quasi fluctuation waveform, said predetermined number of drive times and said predetermined number of drive amounts associated with said aperiodic drive of said motor;

listing numerically said drive times and said drive amounts, and itemizing them per step in a time table;

using said time table to effect one cycle of said fluctuation control mode.

5. A motor control device in a powered seat for controlling a lumbar support device, in which said lumbar support device includes a lumbar plate for pressingly supporting a lumbar part of an occupant on the seat, said motor control device comprising:

a motor for causing a fore-and-aft movement of said lumbar plate with respect to a seat back of said seat;

a manual switch means operable to manually control a drive of said motor, thus effecting a manual control mode so as to permit a manual adjustment of a position of said lumbar plate in a fore-and-aft direction;

a burst control switch means operable to effect a burst control mode for controlling said drive of said motor in a periodic way, so as to repeat said fore-and-aft movement of said lumbar plate in generally periodic way;

a fluctuation control switch means operable to effect a fluctuation control mode for controlling said drive of said motor in an aperiodic way, so as to repeat said fore-and-aft movement of said lumbar plate in said aperiodic way;

wherein said burst and fluctuation control modes are both effected as an automatic control mode;

a drive circuit including a switching element for driving or stopping said motor;

a detection means for detecting a position of said lumbar plate;

a central processing unit which processes an input data according to a predetermined program and controls at least said motor; and a means for permitting a selection to be done for one of said manual control mode and said automatic control mode.

6. The motor control device as defined in claim 5, wherein, in said fluctuation control mode, said periodic drive of said motor is effected according to a predetermined number of drive times and predetermined number of drive amounts, both of which are set on a basis of a predetermined number of frequency portions and a predetermined number of period portions which are both obtained from a 1/f fluctuation waveform synthesized under a predetermined Fourier series.

7. The motor control device as defined in claim 5, wherein said device further includes a burst control indication means for noticing that said burst control mode is being carried out until one cycle thereof is completed, and a fluctuation control indication means for noticing that said fluctuation control mode is being carried out until one cycle thereof is completed.

8. The motor control device as defined in claim 5, wherein said device further includes a second motor for causing said lumbar plate to be moved upwardly and downwardly through, under said a manual control mode, a switch means operable to effect such vertical movement of said lumber plate.

* * * * *